(12) United States Patent
Schmid et al.

(10) Patent No.: US 11,148,597 B2
(45) Date of Patent: Oct. 19, 2021

(54) RAIL VEHICLE, METHOD FOR PRODUCING A RAIL VEHICLE, AND USE OF A SCISSOR MECHANISM IN A BOARDING ARRANGEMENT

(71) Applicant: STADLER ALTENRHEIN AG, Altenrhein (CH)

(72) Inventors: Marcel Schmid, Altenrhein (CH); Alexander Bosshart, Altenrhein (CH)

(73) Assignee: STADLER RAIL AG, Bussnang (CH)

( * ) Notice: Subject to any disclaimer, the term of this patent is extended or adjusted under 35 U.S.C. 154(b) by 353 days.

(21) Appl. No.: 16/332,487

(22) PCT Filed: Sep. 19, 2016

(86) PCT No.: PCT/EP2016/072194
§ 371 (c)(1),
(2) Date: Mar. 12, 2019

(87) PCT Pub. No.: WO2018/050257
PCT Pub. Date: Mar. 22, 2018

(65) Prior Publication Data
US 2019/0232980 A1  Aug. 1, 2019

(51) Int. Cl.
*B60R 3/02* (2006.01)
*B61D 23/00* (2006.01)
*B61D 23/02* (2006.01)

(52) U.S. Cl.
CPC .............. *B60R 3/02* (2013.01); *B61D 23/00* (2013.01); *B61D 23/025* (2013.01)

(58) Field of Classification Search
CPC ...... B61D 23/025; B61D 23/00; B61D 23/02; B61D 19/00; B61D 1/00; B61D 13/00;
(Continued)

(56) References Cited

U.S. PATENT DOCUMENTS 2,522,674 A * 9/1950 Heyerdahl ............. B61D 23/02
105/430
3,924,545 A  12/1975 Anders et al.
(Continued)

FOREIGN PATENT DOCUMENTS

DE  42 20 469 C1  7/1993
DE  201 04 221 U1  8/2001
(Continued)

OTHER PUBLICATIONS

Russian Office Action issued in corresponding Russian Patent Application 2019111659 dated Feb. 7, 2020.
(Continued)

*Primary Examiner* — Robert J McCarry, Jr.
*Assistant Examiner* — Cheng Lin
(74) *Attorney, Agent, or Firm* — Finch & Maloney, PLLC; Michael J. Bujold; Jay S. Franklin

(57) ABSTRACT

The invention relates to a rail vehicle. The rail vehicle comprises at least one rail vehicle outer wall. The rail vehicle further comprises a boarding arrangement having at least one first sliding step and one second sliding step. The first sliding step and the second sliding step are mounted so as to be laterally sliding. The first sliding step and the second sliding step can slide from a travel position to an end position by a lateral retraction movement in the direction of the outer wall of the rail vehicle. In the end position, the second sliding step protrudes beyond the first sliding step.

15 Claims, 6 Drawing Sheets

Figure 1:
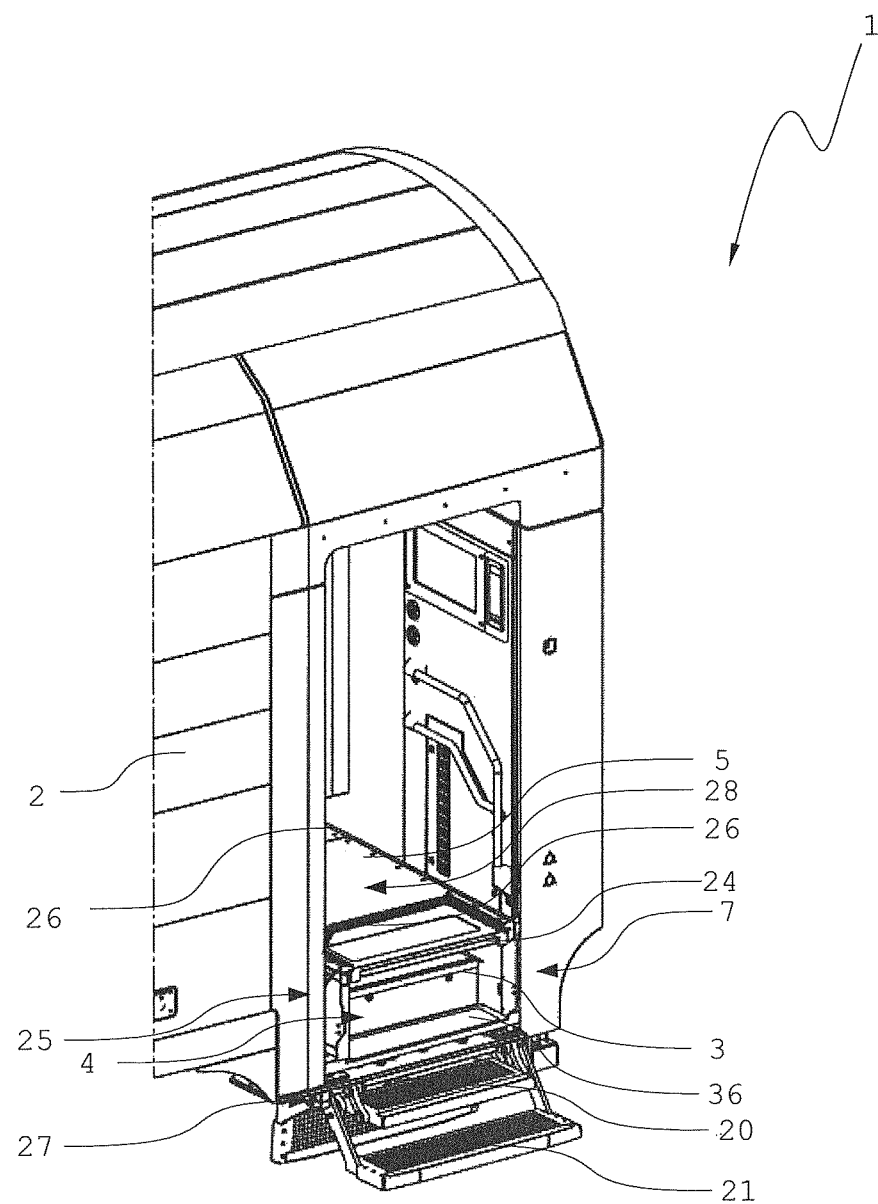

(58) Field of Classification Search
CPC .... E06C 1/30; B60R 3/02; B60R 3/00; A61G 3/068; A61G 3/062; A61G 3/061
USPC ....... 105/341, 343, 425, 427, 430, 432, 433, 105/443, 444, 447, 448, 449; 280/166
See application file for complete search history.

(56) References Cited

U.S. PATENT DOCUMENTS

| | | | | |
|---|---|---|---|---|
| 4,180,366 | A * | 12/1979 | Roth | B60P 1/4457 |
| | | | | 414/540 |
| 4,251,179 | A * | 2/1981 | Thorley | A61G 3/068 |
| | | | | 414/545 |
| 4,527,941 | A * | 7/1985 | Archer | B60R 3/02 |
| | | | | 182/157 |
| 9,937,933 | B2 * | 4/2018 | Basily | B61D 23/025 |
| 2004/0211336 | A1 | 10/2004 | Lamarche | |
| 2008/0028546 | A1 * | 2/2008 | Fullerton | B61D 23/025 |
| | | | | 14/71.1 |
| 2010/0264618 | A1 * | 10/2010 | Agoncillo | B60R 3/02 |
| | | | | 280/166 |

FOREIGN PATENT DOCUMENTS

| | | |
|---|---|---|
| DE | 20 2006 016 432 U1 | 4/2008 |
| FR | 2 873 635 A1 | 2/2006 |
| GB | 1 410 615 | 10/1975 |
| KR | 2013-0024068 A | 3/2013 |
| KR | 2014-0033602 A | 3/2014 |
| RU | 2087355 | 8/1997 |
| SU | 1318455 | 6/1987 |
| WO | 2013/053596 A1 | 4/2013 |
| WO | 2013053596 | 4/2013 |

OTHER PUBLICATIONS

International Search Report Corresponding to PCT/EP2016/072194 dated Jul. 7, 2017.
Written Opinion Corresponding to PCT/EP2016/072194 dated Jul. 7, 2017.

* cited by examiner

RAIL VEHICLE, METHOD FOR PRODUCING A RAIL VEHICLE, AND USE OF A SCISSOR MECHANISM IN A BOARDING ARRANGEMENT

The present invention relates to a rail vehicle, a method for producing a rail vehicle and use of a scissor mechanism in a boarding arrangement according to the preambles of the independent claims.

In rail travel, rail vehicles come to a standstill in stations at platforms. At the platforms there is a spacing between the train and the platform. As a result of the spacing, there is a gap between the train and the platform. In order to minimize the risk of rail passengers falling into this gap, a footboard is generally deployed from the train. The passengers can then safely reach the train via the footboard.

A particular challenge results from the fact that there is not only a horizontal spacing between the train and platform, but also a vertical one. The vertical spacing refers to the height difference between the platform and rail vehicle floor. This is significantly influenced by the height of the platform since the spacing between the rail and the rail vehicle floor is largely constant.

The height of the platform is determined by standards, wherein a large number of standards exist. For the European region, for example, the Technical Specification for Interoperability (TSI) applies, whilst in Russia the GOST (Gossudarstwenny Standard) is applied. In particular, GOST enables large height differences between the upper rail edge and platform. Thus, this difference may be either 1100 mm (urban stations) or 200 mm (rural stations). As a result, the differences between the platform and vehicle floor vary significantly and place increased demands on the flexibility of alighting from a rail vehicle.

KR 2014/0033602 A discloses a two-step sliding footboard for use in a rail vehicle. A second step is deployed by means of a block module which is moved by an electrically driven leading spindle in a rail, wherein the first step is initially connected to the second step and is therefore also deployed. When the position for use is reached (above the step recess), the first step is released from the second step and thus remains in the position for use. The second step then has to be manually folded out. KR 2014/0033602 has the disadvantage that only the first step is automatically and electrically controlled whilst the second step is manually folded out.

KR 2013/0024068 A discloses a two-step sliding footboard for use in a rail vehicle. A first step is deployed by means of a roller mechanism, a drive belt and an electric drive, wherein in the deployed state it covers the step recess of the rail vehicle. The second step is fitted below the first step and is deployed by means of a pneumatic cylinder, two connection modules, each comprising a rotation axle and two arms. A complex drive is used in KR 2013/0024068.

US 2004/211336 A discloses a sliding footboard, which can be deployed over the step recess of a rail vehicle and beyond. The sliding footboard has a projection and is deployed and retracted in a guiding frame (driven by an electric rack and pinion drive). However, the sliding footboard in US 2004/211336 A enables only a small range and consequently supports the passenger during boarding only in an inadequate manner since only one step of the sliding footboard is deployed.

U.S. Pat. No. 3,924,545 A sets out a sliding footboard which can be deployed and retracted via an electrically driven rail/chain mechanism. The sliding footboard is fitted directly below a floor. U.S. Pat. No. 3,924,545 A is also only single-step.

WO 2013/053596 A1 sets out a passenger rail vehicle having four different boarding levels. In this instance, a folding step is provided for a first boarding level, a sliding footboard is provided for a second boarding level, a step is provided for a third boarding level and a foldable ramp is provided for a fourth boarding level. The operation of the foldable ramp is disadvantageous since it requires a complex drive or even has to be operated manually.

An object of the invention is therefore to overcome the disadvantages of the prior art. In particular, there is intended to be provided a device which enables safe boarding, can be produced in a simple manner and can be driven in a simple manner.

This object is achieved with the device defined in the independent patent claims, the method defined in the independent patent claims and the use. Other embodiments will be appreciated from the dependent patent claims.

A first aspect of the present invention relates to a rail vehicle. In particular, the invention relates to a rail vehicle for passenger transport. The rail vehicle comprises at least one rail vehicle outer wall. In particular, the rail vehicle comprises at least a first step, wherein this step overcomes a height difference between a rail vehicle floor and a lower exit.

Furthermore, the rail vehicle comprises a boarding arrangement having at least a first sliding footboard and a second sliding footboard. The first sliding footboard is driven by means of a drive unit. In this instance, the first sliding footboard and the second sliding footboard are supported so as to be able to slide laterally. The first sliding footboard and the second sliding footboard can each be pushed from a travel position by means of a lateral deployment movement in the direction of the rail vehicle outer wall into an end position. In the end position thereof, the second sliding footboard protrudes beyond the first sliding footboard.

The boarding arrangement is arranged in the boarding region of the rail vehicle.

The boarding arrangement contains a coupling mechanism for coupling the first sliding footboard and the second sliding footboard. The deployment movement of the first sliding footboard brings about via the coupling mechanism the deployment movement of the second sliding footboard.

The drive unit is in a particularly preferred manner an electrical unit, such as an electric motor, which in a possible embodiment transmits the deployment movement to the boarding arrangement via a toothed wheel. Alternatively, the drive unit may also be configured pneumatically or hydraulically. In a particularly preferred manner, the drive unit contains a linear drive.

Preferably, the rail vehicle comprises only a single drive unit for the first and the second sliding footboard.

The deployment movement may in this instance be continuous or intermittent. The direction "lateral" refers to the rail vehicle. Preferably, lateral is a direction with a component which faces substantially at right-angles to the travel direction of the rail vehicle and, in a particularly preferred manner, lateral is intended to mean at right-angles relative to a travel direction of the rail vehicle.

The rail vehicle floor refers to the level of a floor of an inner space of a rail vehicle.

The rail vehicle according to the invention has the advantage that the sliding footboards can be controlled with only one motor.

An optional advantage is that large spacings between the rail vehicle and platform can be overcome by using two sliding footboards, wherein at the same time the structural depth in the transverse direction of the vehicle does not act in a limiting manner. Furthermore, the advantage may be afforded that, as a result of the coupling mechanism, the sliding footboards can be stored in the travel position in a space-saving manner.

In a preferred embodiment, the coupling mechanism couples the deployment movement of the first sliding footboard and the second sliding footboard in such a manner that the first sliding footboard and the second sliding footboard reach their end position simultaneously.

Since the sliding footboards move simultaneously, they reach the end position more quickly than when they move sequentially.

In a preferred embodiment, the coupling mechanism couples the deployment movement of the first sliding footboard and the second sliding footboard in such a manner that the first sliding footboard and the second sliding footboard leave their travel position simultaneously.

Since the sliding footboards move simultaneously, they reach the end position more quickly than when they move sequentially.

In a preferred embodiment, the lateral deployment movement of the first sliding footboard is subdivided into a first portion and a second portion. In this instance, the coupling mechanism couples the first sliding footboard and the second sliding footboard in such a manner that, during the deployment movement of the first sliding footboard, in the first portion no relative movement is produced with respect to the second sliding footboard.

A first portion of the deployment movement can thereby be carried out whilst a vehicle door is still closed. Consequently, the sliding footboards only have to travel a shorter distance when the door is opened.

In a preferred embodiment, the coupling mechanism couples the first sliding footboard and the second sliding footboard in such a manner that, during the deployment movement of the first sliding footboard, in the second portion a relative movement is produced with respect to the second sliding footboard.

As a result of the coupling, the speed at which the sliding footboards can be deployed is increased. Furthermore, it is possible to dispense with a second motor or manual operation for the second sliding footboard.

In a preferred embodiment, the first sliding footboard after passing through the first portion of the lateral deployment movement covers the at least first step when viewed from above.

The safety in the train is thereby increased. A rail vehicle passenger then cannot fall down the step(s).

In a preferred embodiment, the coupling mechanism comprises at least a first arm. The first arm is connected at a first end to the first sliding footboard and at a second end to the second sliding footboard.

An arm is a particularly simple possibility for producing the coupling mechanism.

In a preferred embodiment, the coupling mechanism comprises a second arm, wherein the second arm is connected with one end to the second sliding footboard. The first arm and the second arm are rotatably supported in an axle in such a crosswise manner that the first arm and the second arm form a respective scissor lever of a scissor mechanism.

The first and the second arm thereby form a scissor mechanism. The scissor mechanism enables both sliding footboards to be driven using one motor and at the same time a relative movement to be produced between the sliding footboards.

In a preferred embodiment, in the second portion of the lateral deployment movement of the first sliding footboard, the coupling mechanism guides the first end of the first arm and the first end of the second arm together.

A relative movement can thereby be produced between two sliding footboards.

In a preferred embodiment, the first sliding footboard is supported so as to be able to slide laterally in a sliding footboard guide. The coupling mechanism comprises a guide rail. The first end of the first arm is guided in the guide rail and the guide rail extends in a first region parallel with the sliding footboard guide of the first sliding footboard. The guide rail extends in a second region at an angle, in particular at an acute angle, with respect to the sliding footboard guide of the first sliding footboard.

The guide rail has the advantage that it can control the scissor mechanism. Consequently, the path of the guide rail determines the relative movement between the sliding footboards.

In an embodiment, the second sliding footboard is guided at both sides in sliding footboard guides of the first sliding footboard.

In a preferred embodiment, the boarding arrangement further comprises a first folding step and a second folding step. The first folding step and the second folding step can be moved from a travel position into a position for use. The first folding step and the second folding step form in the position for use thereof another step.

As a result of the first folding step, a second platform height can be reached. As a result of the second folding step, a third platform height can be reached.

Another aspect of the present invention relates to a method for producing a rail vehicle. The method comprises the following steps:

providing at least a first rail vehicle outer wall, in particular providing at least a first step, wherein the step overcomes a height difference between a rail vehicle floor and a lower exit;

providing at least a first sliding footboard and a second sliding footboard;

displacing the first sliding footboard and the second sliding footboard from travel positions into end positions by means of a lateral deployment movement in the direction of a rail vehicle outer wall. In this instance, the second sliding footboard protrudes in the end position thereof beyond the first sliding footboard in the end position thereof. A drive unit drives the first sliding footboard.

The deployment movement of the first sliding footboard brings about the deployment movement of the second sliding footboard by means of a coupling mechanism.

The rail vehicle according to the invention has the advantage that the sliding footboards can be controlled using only one motor.

An optional advantage is that large spacings between the rail vehicle and platform can be overcome by two sliding footboards being used, wherein at the same time the structural depth in the transverse direction of the vehicle does not act in a limiting manner. Furthermore, the advantage may be afforded that as a result of the coupling mechanism the sliding footboards can be stored in space saving manner in the travel position.

Preferably, the first sliding footboard and the second sliding footboard reach the end position thereof simultaneously when deployed.

Preferably, the first sliding footboard and the second sliding footboard leave the travel position thereof simultaneously.

Since the sliding footboards move simultaneously, they reach the end position more rapidly than if they move sequentially.

Preferably, when the first sliding footboard and the second sliding footboard are deployed, in the first portion no relative movement is produced between the first sliding footboard and the second sliding footboard.

A first portion of the deployment movement can thereby be carried out whilst a vehicle door is still closed. Consequently, the sliding footboards only have to travel a shorter distance when the door is opened.

Preferably, when the first sliding footboard and the second sliding footboard are deployed, in the second portion a relative movement is produced between the first sliding footboard and the second sliding footboard.

As a result of the coupling, the speed at which the sliding footboards can be deployed increases. Furthermore, a second motor or manual operation for the second sliding footboard can be dispensed with.

Another aspect of the present invention relates to use of a scissor mechanism in a boarding arrangement for deploying a second sliding footboard. In particular the scissor mechanism is used in a rail vehicle. The scissor mechanism converts a deployment movement of a first sliding footboard into a deployment movement of the second sliding footboard.

The scissor mechanism enables a movable connection between two sliding footboards. In this instance, two sliding footboards can be moved simultaneously at different speeds.

Preferably, the scissor mechanism is used in the vehicle inner space of a rail vehicle.

Figure 2:
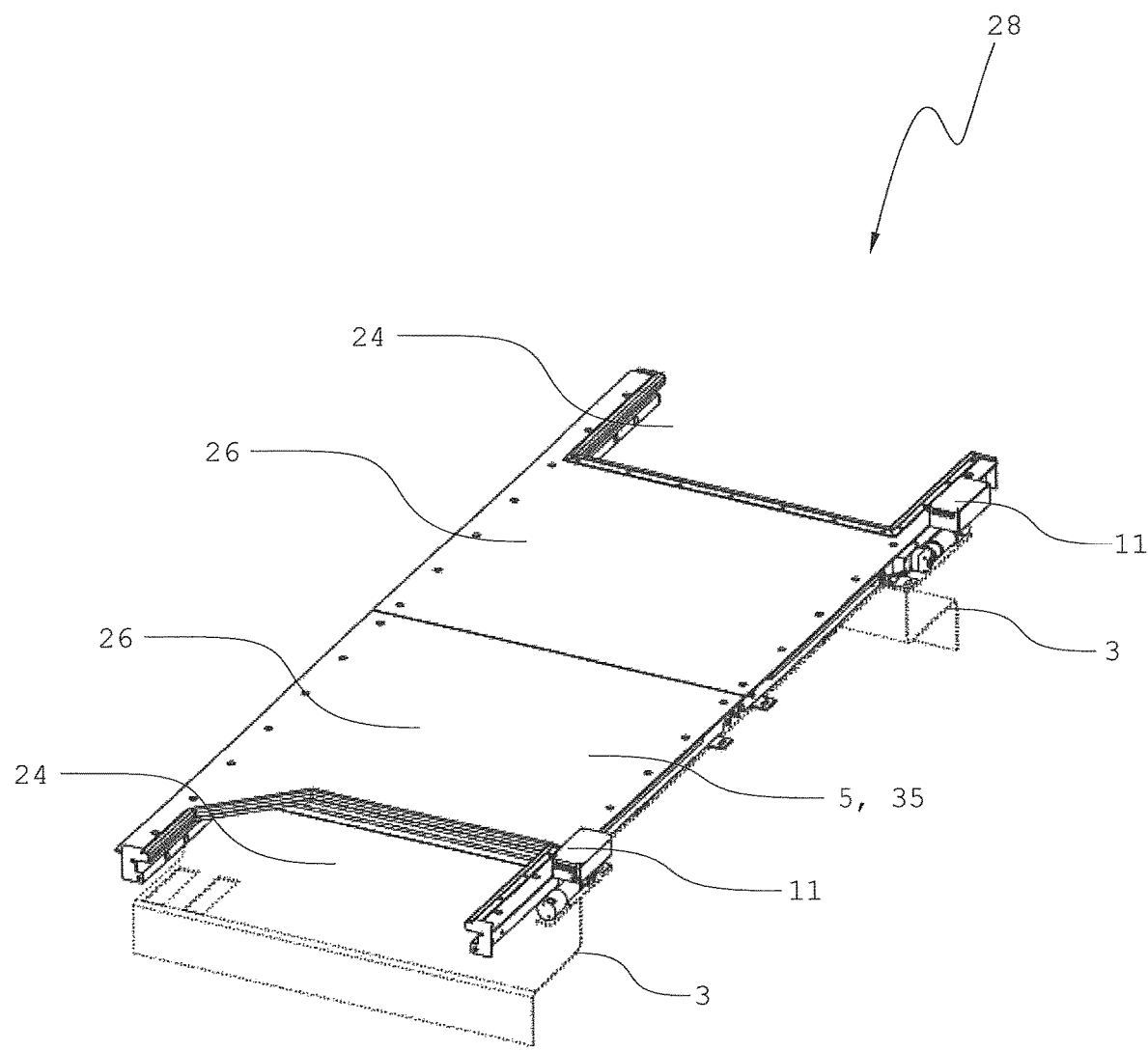
Figure 3:
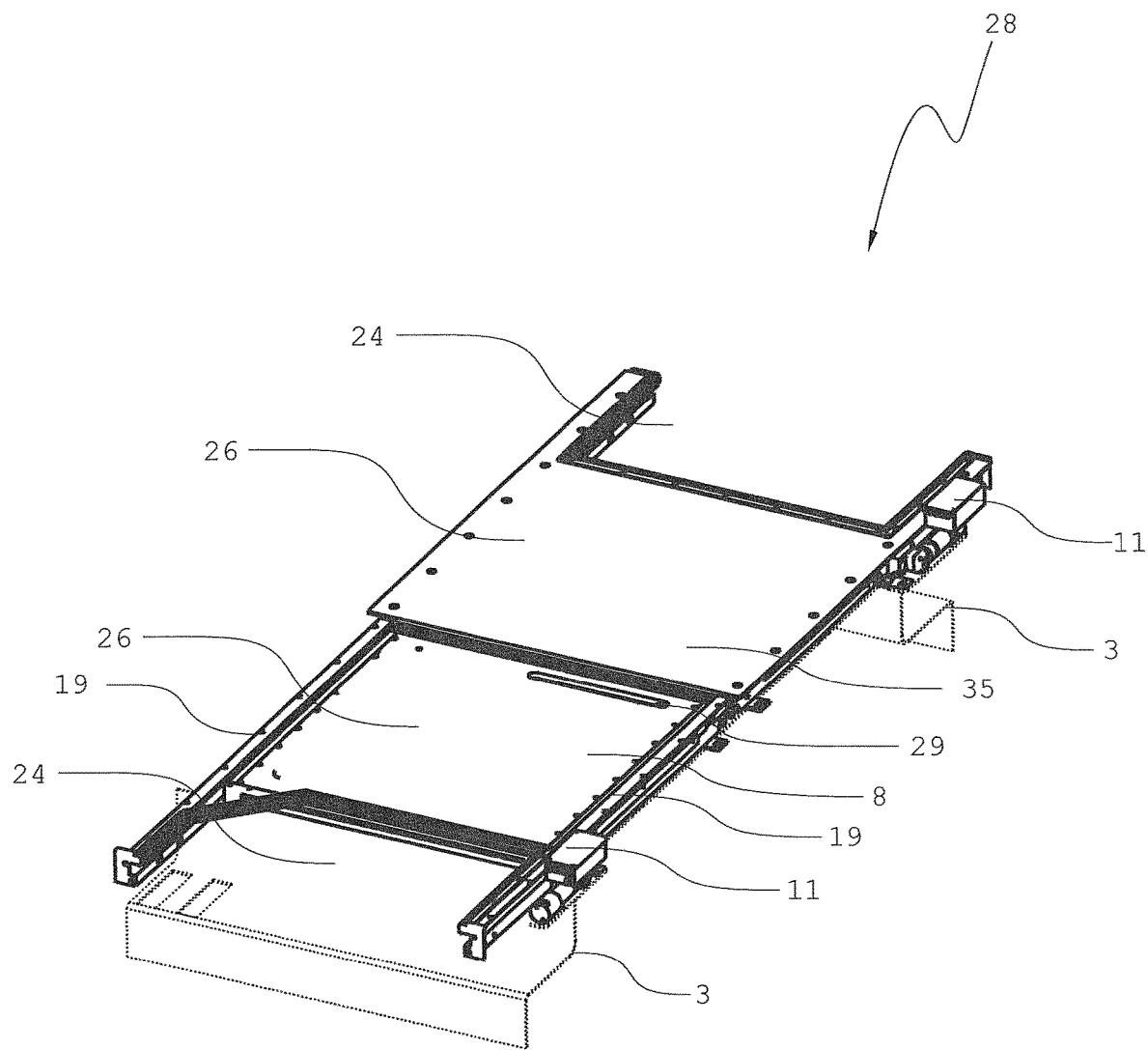
Figure 4:
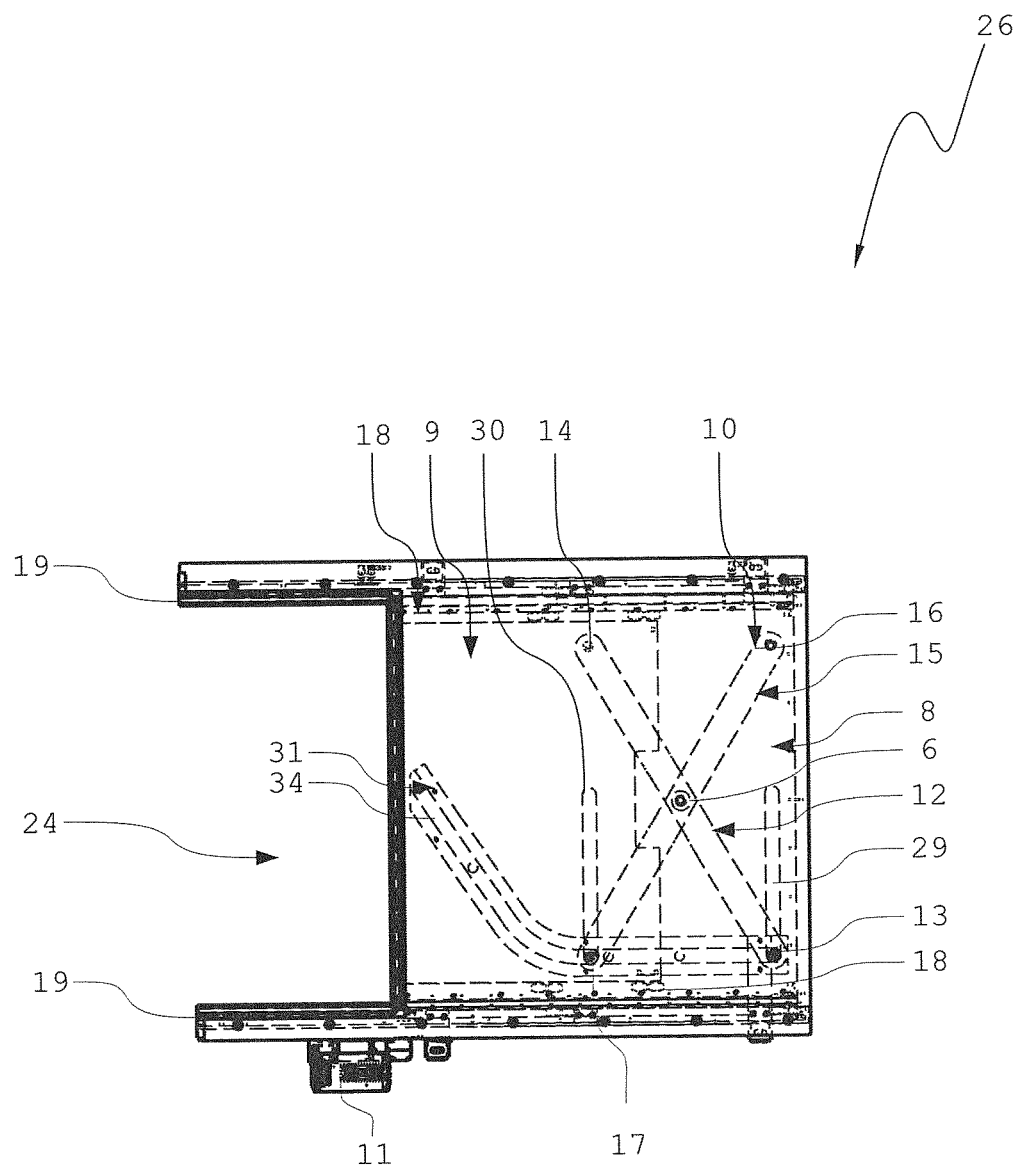
Figure 5:
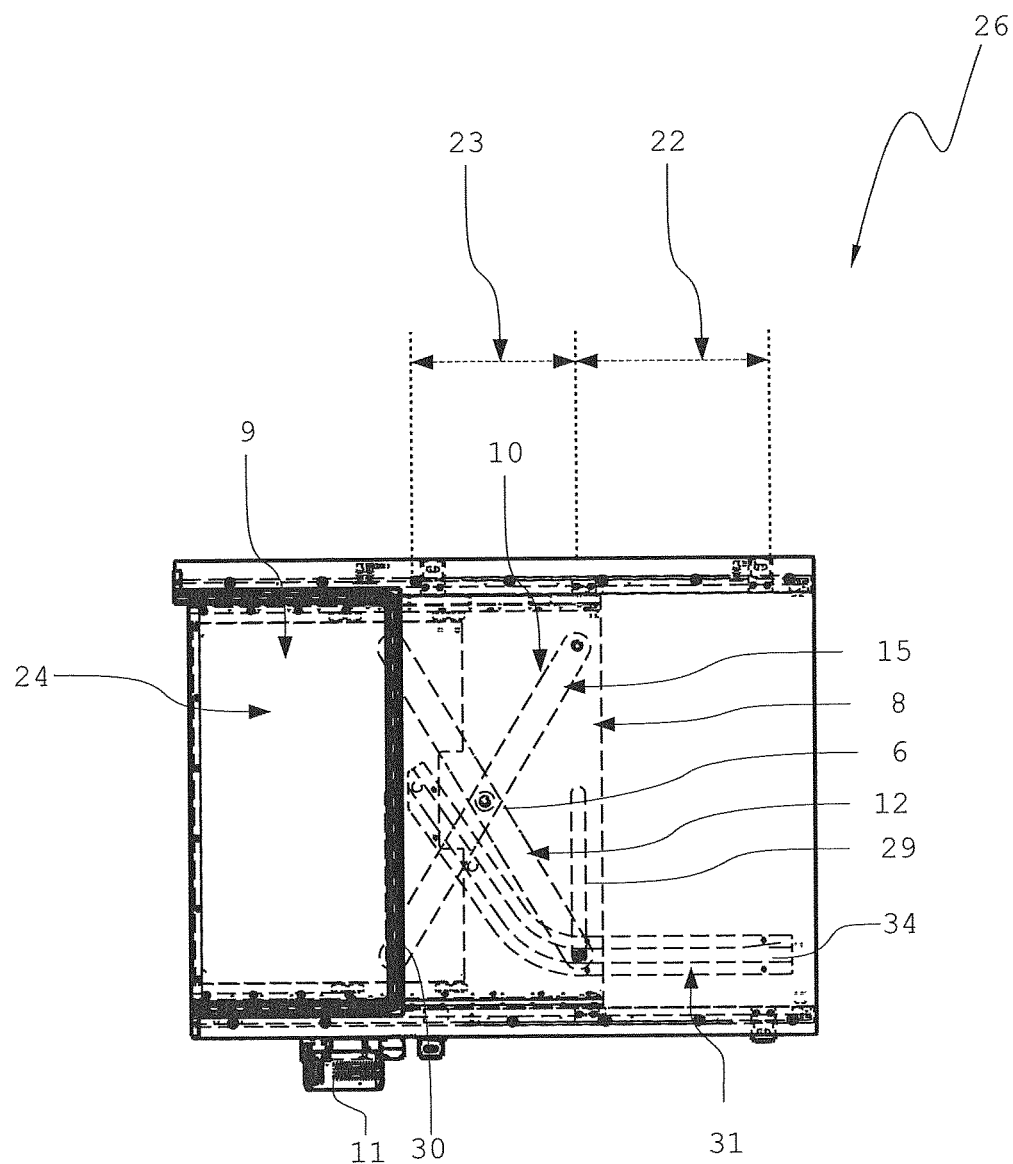
Figure 6:
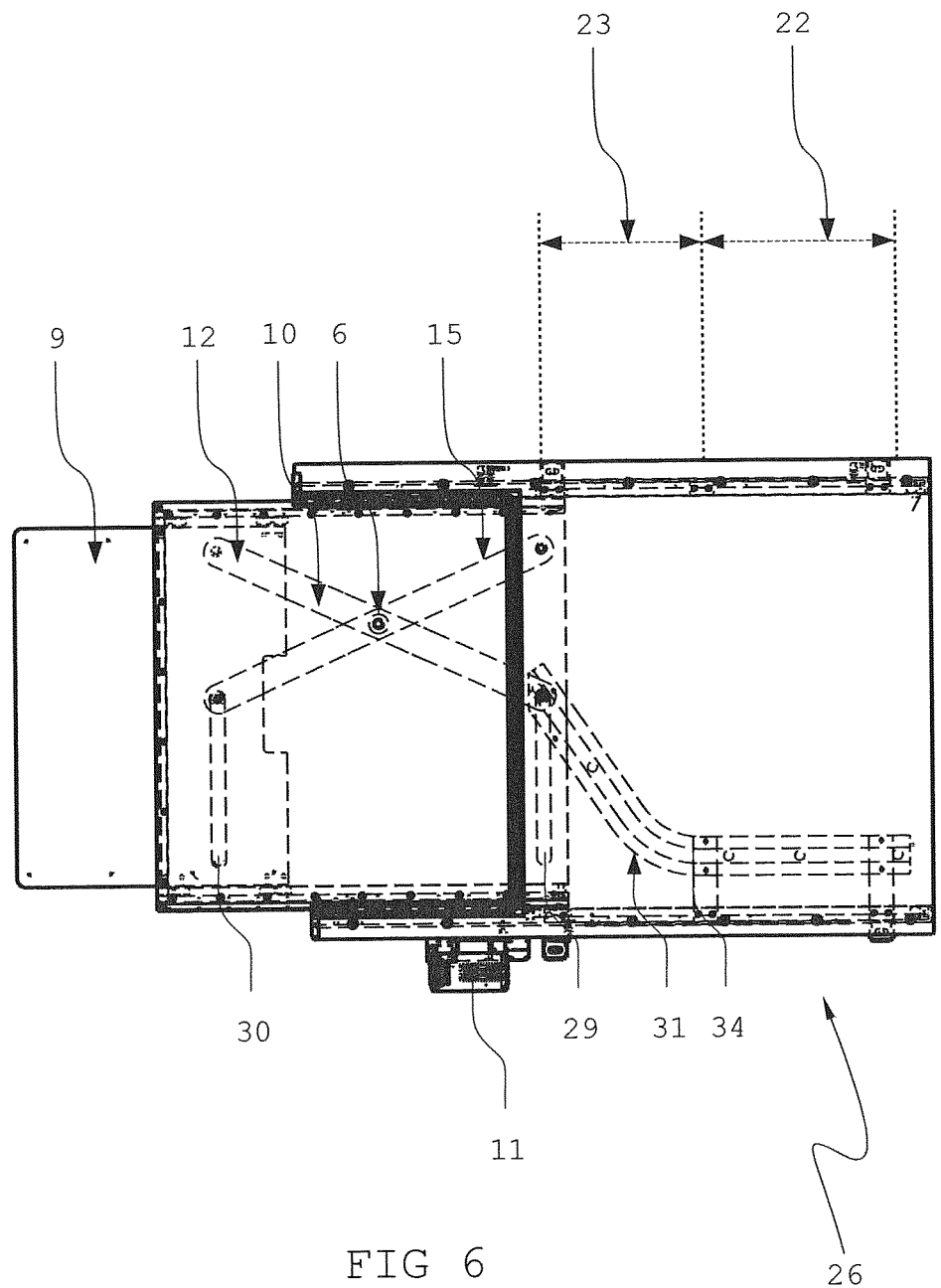

The invention is explained in greater detail below with reference to Figures which illustrate only exemplary embodiments. In the schematic drawings:

FIG. 1: is a schematic illustration of a rail vehicle with a sliding footboard arrangement in the boarding region, FIG. 2: is a schematic illustration of a sliding footboard arrangement, FIG. 3: is a schematic illustration of a sliding footboard arrangement without a covering sheet, FIG. 4: is a schematic illustration of a sliding footboard arrangement in a travel position, FIG. 5: is a schematic illustration of a sliding footboard arrangement at the end of a first stage, FIG. 6: is a schematic illustration of a sliding footboard arrangement at the end of a second stage.

FIG. 1 shows a boarding region 25 of a rail vehicle 1. The boarding region 25 is provided in an outer wall 2 of the rail vehicle 1. In the boarding region 25, passengers climb from a platform (not shown) into the rail vehicle 1. The passengers reach the rail vehicle floor 5 from the platform. Depending on the height of the platform, the passengers use a telescope-like sliding footboard arrangement 28 or a first step 3 and optionally a folding step 27. In this instance, the first step 3 is located in a step recess 24 of the telescope-like sliding footboard arrangement 28. The telescope-like sliding footboard arrangement 28 contains two telescope-like sliding footboards 26 (see also FIG. 2).

These devices enable the passenger to overcome a height difference between the platform and the rail vehicle floor. Together the folding step 27, one of the telescope-like sliding footboards 26 and the first step 3 form a boarding arrangement 7 for the rail vehicle 1.

The different boarding heights are achieved by the use of different steps. Low platforms can be achieved by the folding step 27 in combination with the first step 3. In a variation for the next-highest platforms, the folding step 27 is not folded out and the passengers step directly over the first step 3 into the rail vehicle 1. If the platform is at the same height or a slightly lower or higher height than the rail vehicle floor 5, the boarding can be facilitated by the telescope-like sliding footboard 26.

The folding step 27 is provided in order to reach heights which are below the rail vehicle floor 5. The folding step 27 contains 2 folding steps 20, 21. In contrast to the telescope-like sliding footboard 26, the folding steps 20, 21 are arranged outside a rail vehicle inner space. In the travel position, the folding steps 20, 21 are folded onto the rail vehicle outer wall 2 or folded away underneath the rail vehicle 1. Upon arrival at a platform, the folding steps 20, 21 are folded out in a rotational movement from the travel position. The rotation is in this instance about an axle which faces in the travel direction of the rail vehicle 1.

FIG. 2 shows the telescope-like sliding footboard arrangement 28. The telescope-like sliding footboard arrangement 28 comprises two telescope-like sliding footboards 26. The rail vehicle has at each of the two outer sides a boarding region 25. Each of the boarding regions 25 has a telescope-like sliding footboard 26. The rail vehicle floor 5 is arranged at the upper side of the telescope-like sliding footboard 26. Both telescope-like sliding footboards 26 contain a step recess 24. In the step recesses 24 there is a first step 3 (broken lines). As a result of the step recess 24, the first step 3 can be reached. The rail vehicle floor 5 is formed by a covering sheet 35. Each of the telescope-like footboards 26 has a drive unit 11. The drive unit 11 is an electric motor.

FIG. 3 shows the telescope-like sliding footboard arrangement 28 from FIG. 2. One of the telescope-like sliding footboards 26 is shown without the covering sheet 35. A first sliding footboard 8 thereby becomes visible. The first sliding footboard 8 is guided by a first set of sliding rails 19. The drive 11 drives the first sliding footboard 8. The first sliding rails 19 for the first sliding footboard 8 reach from a center of a rail vehicle as far as the rail vehicle outer wall 2 (see FIG. 1). The drive 11 is electric and drives the first sliding footboard 8 via a toothed wheel. As a result of the drive, the first sliding footboard 8 is driven laterally, that is to say, to the side with respect to the travel direction of the rail vehicle 1. In FIG. 3, the first sliding footboard 8 is completely below the covering sheet (not shown) of the rail vehicle floor 5. This position is the travel position.

FIGS. 4, 5 and 6 show one of the telescope-like sliding footboards 26 of the telescope-like sliding footboard arrangement 28 from FIGS. 2 and 3 as a plan view in different stages when the telescope-like sliding footboard is deployed. In the plan view, the rail vehicle floor 5 is illustrated so as to be transparent so that, as in FIG. 3, the first sliding footboard 8 can be seen and is illustrated with broken lines. The first sliding footboard 8 is also illustrated in a transparent manner. In FIG. 4, therefore, a second sliding footboard 9 can be seen. In the view shown in FIG. 4, the first and the second sliding footboards 8, 9 are in the travel position. The second sliding footboard 9 is guided by a second set of sliding rails 18. The second sliding rails 18 are located at the lower side of the first sliding footboard 8 and are securely connected thereto. Consequently, the first sliding footboard 8 and the second sliding footboard 9 are provided as one unit. In this instance, however, the second sliding footboard 9 can be moved relative to the first sliding footboard 8.

The two sliding footboards 8, 9 are connected by means of a coupling mechanism 10. The coupling mechanism 10 contains a first arm 12 and a second arm 15. The first arm 12 is connected at a first end 13 to the first sliding footboard 8.

The connection of the first end 13 of the first arm 12 to the first sliding footboard 8 is carried out by means of a cylindrical head which is guided through an elongate hole 29 of the first sliding footboard 8 (see also FIG. 3). The elongate hole 29 extends in the travel direction of the rail vehicle 1. A diameter of the cylindrical head substantially corresponds to the width of the elongate hole 29. During a movement through the elongate hole 29, the cylindrical head rolls along the elongate hole 29. Consequently, the first end 13 of the first arm 12 is movable in the travel direction whilst in a lateral direction relative thereto forces are transmitted via the edge of the elongate hole 29 from the first sliding footboard 8 to the first arm 12.

At a second end 14 of the first arm 12, the first arm 12 is connected to the second sliding footboard 9. The connection to the second sliding footboard 9 is rotatable, but does not enable any movement in the travel direction or laterally relative thereto.

The second arm 15 is at the center thereof rotatably connected via an articulation to the center of the first arm 12. The first arm and the second arm 15 can thereby rotate relative to each other about an axle perpendicular to the rail vehicle floor. This movement corresponds to a scissor movement, wherein the arms 12, 15 rotate about the articulation 6 and represent the scissor arms.

Furthermore, the second arm 15 is connected at a second end 17 to the second sliding footboard 9. The second end 17 of the second arm 15 engages with another cylindrical head in an elongate hole 30 of the second sliding footboard 9. Forces are thereby transmitted in a lateral direction from the second arm 15 to the second sliding footboard 9, whilst the elongate hole 30 permits a movement of the second end 17 of the second arm 15 in the travel direction. A first end 16 of the second arm 15 is connected to the first sliding footboard 8. The connection is articulated so that a rotation movement of the second arm 15 relative to the first sliding footboard 8 is enabled but no translation movement.

The elongate holes 29, 30 enable the arms 12, 15 to move relative to the respective sliding footboards 8, 9 in the travel direction of the rail vehicle 1. In contrast, forces are transmitted in a lateral direction and no movement is permitted.

The first arm 12 of the coupling mechanism 10 is connected at the first end 13 to the first sliding footboard 8. In addition, the first arm 12 is guided at the first end 13 thereof by a guide rail which is produced as a control cam 31. The control cam 31 is a rail which has at the center thereof a longitudinal groove 34. The first arm 12 has at the opposing side of the first sliding footboard 8 a cylindrical continuation. The continuation engages in the longitudinal groove 34 and is thereby redirected by the control cam 31.

When the telescope-like sliding footboard 26 is deployed, there are two stages. In both stages, only the first sliding footboard 8 is directly driven by the drive 11 and consequently moves in the direction of the vehicle outer wall 2 (see FIG. 1).

The second sliding footboard 9 is driven by the coupling mechanism 10. In the first portion, the control cam 31 is linear and parallel with the sliding rails 18, 19. Consequently, a scissor angle between the two arms 12, 15 remains constant. The second end 17 of the second arm 15 is located in an end position of the elongate hole 30. The first end 13 of the first arm 12 is also located in an end position of the elongate hole 29. The cylindrical heads in the elongate holes 29, 30 are thus in their outermost position and transmit forces in a lateral direction.

The forces in the travel direction of the second ends 14, 17 are mutually cancelled out or are absorbed by the second sliding rails 18. Therefore, the second sliding footboard 9 follows the movement of the first sliding footboard 8.

Consequently, in the first stage both sliding footboards move at the same speed. There is therefore no relative movement between the two sliding footboards 8, 9. A position after the end of the first stage is shown in FIG. 5.

After the end of the first stage, the control cam changes its direction. The direction of the control cam 31 now contains a component in the travel direction 36 of the rail vehicle 1. The movement in the travel direction of the first end 13 of the first arm 12 is enabled by the elongate hole 29. This means that the cylindrical end of the first arm 12 in the elongate hole 29 also moves in the travel direction. The secure fixing of the second end 14 of the first arm 12 to the sliding footboard 9 prevents a movement in this direction at the second end of the arm 12. Consequently, the first arm 12 rotates in addition to the translational movement about the second end 14. This rotation pushes the second sliding footboard 9 forward relative to the first sliding footboard 8.

The lateral deployment movement of the first sliding footboard 8 is subdivided into a first portion 22 and a second portion 23, wherein the coupling mechanism couples the first sliding footboard 8 and the second sliding footboard 9 in such a manner that, during the deployment movement of the first sliding footboard 8, in the first portion no relative movement is produceable with respect to the second sliding footboard 9. As a result of the movable connection of the first arm 12 to the second arm 15, a scissor angle is decreased as soon as the first end 13 moves in the travel direction 31 of the rail vehicle. The reduction of the scissor angle means that the second sliding footboard 9 moves forward in a lateral direction relative to the first sliding footboard. The second sliding footboard 9 therefore moves in the second stage more rapidly than the first sliding footboard 8. The second sliding footboard 9 moves in a telescope-like manner below the first sliding footboard 8. An end position in which the second sliding footboard is completely deployed is shown in FIG. 6. This is the end of the second stage.

In the first stage, only the step recess 24 is covered. The first stage can consequently be passed through with closed doors. After a rail vehicle door has been opened, the second stage begins to be deployed in a telescope-like manner in the sliding footboard 8 and sliding footboard 9. With the same mechanism, wherein the drive operates in the opposite direction to the deployment, the telescope-like sliding footboard 26 can also be retracted again.

The invention claimed is:

1. A rail vehicle for passenger transport comprising
at least one rail vehicle outer wall
and
a boarding arrangement having at least a first sliding footboard, a second sliding footboard and a drive unit for the first sliding footboard, wherein the first sliding footboard and the second sliding footboard are supported so as to be able to slide laterally and the first sliding footboard and the second sliding footboard can each be pushed from a travel position by means of a lateral deployment movement in the direction of the rail vehicle outer wall into an end position, wherein the second sliding footboard in the end position thereof protrudes beyond the first sliding footboard in the end position thereof, wherein the boarding arrangement contains a coupling mechanism for coupling the first sliding footboard and the second sliding footboard, wherein the deployment movement of the first sliding footboard brings about via the coupling mechanism the deployment movement of the second sliding footboard wherein the coupling mechanism couples the deployment movement of the first sliding footboard and the second sliding footboard in such a manner that the first sliding footboard and the second sliding footboard leave their travel position simultaneously.

2. The rail vehicle according to claim 1, wherein the coupling mechanism couples the deployment movement of the first sliding footboard and the second sliding footboard in such a manner that the first sliding footboard and the second sliding footboard reach their end position simultaneously.

3. The rail vehicle according to claim 1, wherein the lateral deployment movement of the first sliding footboard is subdivided into a first portion and a second portion, wherein the coupling mechanism couples the first sliding footboard and the second sliding footboard in such a manner that, during the deployment movement of the first sliding footboard, in the first portion no relative movement is produced with respect to the second sliding footboard.

4. The rail vehicle according to claim 3, wherein the coupling mechanism couples the first sliding footboard and the second sliding footboard in such a manner that, during the deployment movement of the first sliding footboard, in the second portion a relative movement is produced with respect to the second sliding footboard.

5. The rail vehicle according to claim 1, wherein the first sliding footboard after passing through a first portion of the lateral deployment movement covers an at least first step when viewed from above.

6. The rail vehicle according to claim 1, wherein the coupling mechanism comprises at least a first arm, wherein a first end of the first arm is connected to the first sliding footboard and a second end of the first arm is connected to the second sliding footboard.

7. The rail vehicle according to claim 6, wherein the coupling mechanism comprises a second arm, wherein the first arm and the second arm are rotatably supported in an axle in such a crosswise manner that the first arm and the second arm form a respective scissor lever of a scissor mechanism.

8. The rail vehicle according to claim 7, wherein a first end of the second arm is connected to the first sliding footboard and a second end of the second arm is connected to the second sliding footboard.

9. The rail vehicle according to claim 7, wherein, in a second portion of the lateral deployment movement of the first sliding footboard, the coupling mechanism guides the first end of the first arm and a first end of the second arm together.

10. The rail vehicle according to claim 6, wherein the first sliding footboard is supported so as to be able to slide laterally in a sliding footboard guide, wherein the coupling mechanism comprises a guide rail, wherein the first end of the first arm is guided in the guide rail, wherein the guide rail extends in a first region parallel with the sliding footboard guide of the first sliding footboard, wherein the guide rail extends in a second region at an angle with respect to the sliding footboard guide of the first sliding footboard.

11. The rail vehicle according to claim 1, wherein the boarding arrangement further comprises a first folding step and a second folding step, wherein the first folding step and the second folding step can be moved from a travel position into a position for use, wherein the first folding step and the second folding step form in the position for use thereof another step.

12. A method for producing a rail vehicle, comprising the following steps:

providing at least a first rail vehicle outer wall;

providing at least a first sliding footboard, a second sliding footboard;

displacing the first sliding footboard and the second sliding footboard from travel positions into end positions by means of a lateral deployment movement in the direction of a rail vehicle outer wall, wherein the second sliding footboard protrudes in the end position thereof beyond the first sliding footboard in the end position thereof, wherein a drive unit drives the first sliding footboard, wherein the deployment movement of the first sliding footboard brings about the deployment movement of the second sliding footboard by means of a coupling mechanism, wherein the first sliding footboard and the second sliding footboard leave the travel position thereof simultaneously.

13. The method according to claim 12, wherein the first sliding footboard and the second sliding footboard reach the end position thereof simultaneously when deployed.

14. The method according to claim 12, wherein, when the first sliding footboard and the second sliding footboard are deployed, in a first portion of the lateral deployment movement of the first sliding footboard no relative movement is produced between the first sliding footboard and the second sliding footboard.

15. The method according to claim 14, wherein, when the first sliding footboard and the second sliding footboard are deployed, in a second portion of the lateral deployment movement of the first sliding footboard a relative movement is produced between the first sliding footboard and the second sliding footboard.

* * * * *